Patented May 13, 1952

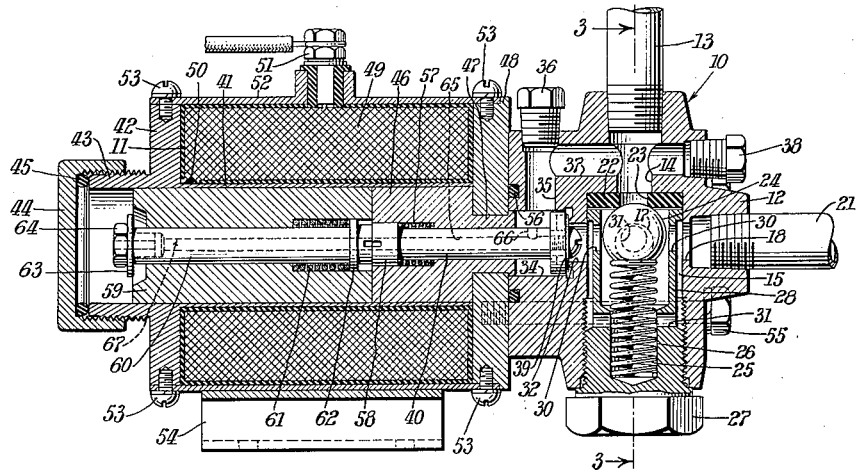

2,596,779

UNITED STATES PATENT OFFICE 2,596,779

ELECTRIC CONTROL FOR BRAKE MECHANISMS

Marion M. McCoy, Newark, N. J.

Application April 2, 1946, Serial No. 658,901

4 Claims. (Cl. 137—139)

This invention relates to fluid brakes for automobiles and/or trucks and it has as its primary object to provide a new and improved means, separate from the brake, clutch or accelerator and completely under the control of the operator, for maintaining the brakes set whenever it is desired to preclude the vehicle from moving under the force of gravity.

At the present time trucks which are fitted with fluid brakes, operated by air or liquid, are maintained halted on an up-grade by the operator holding the brake-pedal depressed. This procedure is satisfactory in precluding the truck from starting to coast backward as long as the brakes are held set. The difficulty arises when the operator attempts again to start the truck or vehicle moving forward. He is required to depress the clutch-pedal while the brake-pedal is also depressed, shift the truck into gear, then hurriedly release the brake-pedal, transfer his foot onto the foot-accelerator and depress the same while the clutch-pedal is gradually being released. In the interval of time between the release of the brake-pedal and until the clutch has been engaged, the truck may have started to coast backward. This backward motion of the truck is usually arrested by the operator through the establishment of the driving power of the truck. When this occurs, the clutch, together with the motor and other elements comprising the driving connections, are subjected to excessive strains and wear.

It is another object of the present invention to provide a brake controlling mechanism useful in effectively maintaining the brakes set as long as desired, thereby preventing vehicles, which have been brought to rest on a hill, from starting to coast backward or forward during the interval of time between the removal of the operator's foot from the brake-pedal and the initiation of the power drive of the vehicle under the influence of the foot-controlled accelerator.

Still another object of the present invention is to provide a brake controlling device which is entirely under control of the operator, and which consequently can be actuated only when needed and by a motion which will not be awkward or unnatural.

A further object of the present invention is to provide a unitary assembly of the class described which is capable of being incorporated in existing fluid brake systems with a minimum of modification.

Other objects and advantages will be in part indicated in the following description and in part rendered apparent therefrom in connection with the drawings depicting a preferred typical construction, which have been annexed as a part of this disclosure and in which:

Fig. 1 represents a longitudinal sectional view of my improved electric control unit, showing the solenoid-actuated check-valve closed, thereby to maintain the brakes locked in set position.

Fig. 2 is a view similar to Fig. 1, but with the solenoid de-energized whereby the by-pass is opened to permit the return flow of the fluid from the brakes.

Fig. 3 represents a transverse vertical sectional view taken substantially along the line 3—3, Fig. 1.

Fig. 4 is a view illustrating the manner in which the solenoid and the control switch on the usual gear-shift lever can be connected in series with a source of power so that the solenoid can be selectively energized or de-energized.

Referring more specifically to the drawings, the invention is disclosed as embodied in a unit adapted to be incorporated in a fluid brake system and provides manually controlled means for preventing return flow of the brake-actuating fluid from the individual brake-actuating cylinders whenever it is desired to maintain the brakes in their set or wheel-locking position. This has been effected by embodying in the brake-conduit system, intermediate the foot-pedal controlled pressure means and the individual brake-actuating cylinders, a solenoid-controlled check-valve which, when in its open or solenoid de-energized position permits forward and reverse flow of fluid through the system for actuating and releasing the brakes by the usual action on the brake-pedal. In the closed or solenoid energized position of the check-valve the fluid may flow forwardly through the system to set the brakes but its return flow to release the brakes is obstructed.

As shown in the drawings, the unit comprises a check-valve 10 and an electric solenoid 11. The check-valve includes a housing 12 connected to the discharge end of the foot-pedal controlled pressure line by a threaded nipple 13. The nipple or fluid inlet pipe connects with a vertical inlet port 14, the lower end of which opens into a central cylindrical cavity 15 provided in the housing 12. Communicating with the central cavity 15 are a plurality of fluid outlet ports 16, 17 and 18. These outlet ports have threaded into them outlet conduits 19, 20 and 21, respectively, which conduits are connected one to the front wheel brakes, one to the rear wheel brakes and one to the trailer brakes in the event the truck is of the trailer type.

Disposed within the central cavity 15 adjacent the lower end of the inlet port 14 is a washer-like valve-seat 22, preferably of neoprene, having a central opening 23 which, at certain times, is adapted to be closed by a steel ball 24 of a one-way-acting valve. The steel-ball 24 is normally spring-biased upwardly into contact with the neoprene valve-seat 22 by a coil-spring 25 having its lower end located in a bore 26 formed in a plug 27 threaded into the lower end of the housing 12. The upper end-portion of the plug 27 is preferably formed as a sleeve 28 extending into the central cavity 15 of the housing 12, the upper end of the sleeve 28 being flanged as at 29, thereby to substantially engage the neoprene valve-seat 22 and maintain it in proper position at the upper end of the cavity 15. The side walls 28 of the sleeved plug 27 are provided with radial ports 30 and 31 to permit the brake-actuating fluid to flow between the inlet port 14 and each of the outlet ports with little impedance.

Formed in the housing 12, preferably at a point substantially opposite to the outlet port 18, is a by-pass port 32 merging at its outer end into a valve-seat 33 disposed in a valve-cavity 34. Communicating with the valve-cavity 34 is a vertical by-pass duct 35 closed at its upper end by a screw-plug 36 and intersected intermediate its ends by a horizontal by-pass duct 37 closed at its outer end by a screw-plug 38. The horizontal by-pass duct 37 connects with the fluid inlet port 14. Cooperating with the valve-seat 33 is a valve-washer 39 carried on the inner end of a valve-stem 40 later to be described.

With the above description in mind, it will be understood that when the parts are in the position shown in Fig. 1, fluid is admitted under pressure effected by the actuation of the brake-pedal through the inlet pipe 13 into the inlet port 14. When the pressure of the fluid exceeds the pressure exerted by the coil-spring 25, the ball-valve 24 opens and permits the passage of fluid through the radial ports 30 and 31 into the central cavity 15 and thence out through each of the outlet conduits 19, 20 and 21 into the usual individual brake-actuating cylinders. When the brake-pedal is released, thereby effecting a release of the pressure in the inlet port 14, the ball-valve resets itself against the neoprene seat, thus effectively locking the fluid in the brake-actuating cylinders. In other words the brakes are maintained set. When it is desired to release the brakes, the valve-washer 39 is caused to move to open position as shown in Fig. 2. When this occurs the fluid by-pass, which includes the port 32, the valve-cavity 34 and the ducts 35 and 37, is opened, thus permitting the instant return of the fluid from the brake-actuating cylinders to and back through the inlet pressure pipe 13.

The electric solenoid which is used to control the valve-washer 39 comprises an inner sleeve member 41 having integral therewith an end-flange 42 formed with an externally threaded extension 43. Threaded upon the extension 43 is a closure-cap 44. Interposed between the inner face of the closure-cap 44 and the end of the extension 43 is a gasket preferably in the form of a resilient ring 45 consisting of neoprene. Press-fitted into the end of the sleeve 41 remote from the flange 42 is a bushing 46 formed with a reduced portion 47 adapted to extend through the center hole of an end-flange disk 48. The exposed end of the reduced portion 47 of the bushing 46 is preferably spun over to rivet the end-flange 48 in place, thus forming with the sleeve 41 and flange 42 a casing within which is wound a conventional wire coil indicated as 49. One end of the wire forming the coil 49 is soldered, as at 50, to the inner sleeve 41 and the other end is fastened to a binding post 51 provided in a cylindrical covering shell 52 secured by screws 53 to the end-flanges 42 and 48. Attached to the covering shell 52, as by spot-welding, is a supporting bracket 54 which can be fastened preferably to the chassis C (Fig. 4) of the vehicle.

As shown in Figs. 1 and 2, the spun end of the reduced portion 47 of the bushing 46 is sized to slidingly fit the valve-cavity 34 in the check-valve housing 12. This arrangement effectively alines the check-valve housing 12 with the solenoid and facilitates the proper assembly of these units. As will be seen in Figs. 1 and 3, the housing 12 is secured to the end-flange 48 preferably by four through-bolts 55 threaded into the end-flange 48. To effect a fluid-tight seal between the housing 12 and the end-flange 48, I have provided a ring-gasket 56, preferably of neoprene, disposed in a circular groove formed in the face of the housing 12.

The valve-washer 39 is carried on the exposed outer end of the stem 40 which is endwise slidable in the bushing 46. Surrounding the stem at its inner end is a coil-spring 57 acting between a shoulder on the bushing and the head 58 of the stem 40, whereby the valve-washer 39 is normally spring-biased away from the valve-seat 33 in the manner shown in Fig. 2. To force the valve-washer 39 against the valve-seat 33, thereby to close the fluid by-pass, there is slidably disposed in the solenoid-casing-sleeve 41 a suitable cylindrical core-element 59. Journaled for endwise movement in the core-element 59 is a plunger 60 biased toward the inner end of the core-element by a coil-spring 61 acting between a shoulder on the core-element and the flanged head 62 of the plunger 60. The endwise movement of the plunger effected by the coil-spring 61 is limited by a washer 63 secured on the plunger 60 by a short screw-stud 64 threaded into said plunger. The valve-stem 40 is rifled, as at 65, and provided with a radial hole 66 opening into the periphery of the valve-stem, while the plunger 59 is rifled, as at 67, which rifling extends axially through the screw-stud 64. The purpose of the rifling will be explained later.

Referring to Fig. 4, it will be seen that the solenoid 11, which is grounded to the chassis C, is connected in series with a source of electrical power B and with a manually controlled switch S substituted for the usual knob on the gear-shift lever L. To indicate when the switch S is on, there is preferably provided within the knob a light bulb (not shown) connected so that it is lighted when the solenoid is energized. The light bulb is adapted to shine through a reflector R in the top of the gear-shift knob to provide a signal for the operator.

*Operation*

Assuming that the component parts of my improved electric control have been assembled as shown in the drawings and that the control has been incorporated in a fluid brake system, such for example as a conventional air brake system, the operation is as follows: With the switch S open, in which case the solenoid is de-energized and the component parts of the electric control are in the positions shown in Fig. 2 of the drawings, the operator may depress and release the brake-pedal thereby applying and releasing the brakes at will, the air flowing outwardly through the inlet pipe 13, past the one-way ball-valve 24 into the cavity 15 and thence through the ports 16, 17 and 18 into the outlet conduits 19, 20 and 21 and returning through the same outlet conduits and ports into the cavity 15 and through the by-pass port 32 and ducts 35 and 37 into the inlet pipe 13.

Now should the operator desire to apply the brakes and have them hold without maintaining the brake-pedal depressed, as frequently occurs when stopping on a hill, the operator closes the switch S which completes the circuit through the solenoid thereby causing the core-element 59 to move inwardly from the position shown in Fig. 2 to the position shown in Fig. 1. During this movement of the core-element 59 the plunger 60 carried thereby contacts the valve-stem 40 and, since the coil-spring 61 is stronger than the coil-spring 57, the latter is compressed and the valve-stem is moved inwardly so that the valve-washer 39 carried thereby engages the valve-seat 33, effectively closing the fluid by-pass passageway. The force exerted on the core-element 59 by the solenoid is quite sufficient to cause the core-element to move into abutting contact with the end of the bushing 46, as shown in Fig. 1. This abutting contact of the core-element 59 and bushing 46 causes a compression of the stronger coil-spring 61 which results in a reaction on the end of the valve-stem 40 tending to firmly seat the valve-washer 39 against its seat 33.

With the fluid by-pass thus effectively closed, it will be appreciated that when the brake-pedal is depressed air is admitted under pressure through the inlet pipe 13 and port 14 and that when the pressure exceeds the pressure exerted by the coil-spring 25, the ball-valve 24 opens and permits the passage of air through the radial ports 30 and 31 into the central cavity 15 and thence out through each of the outlet conduits 19, 20 and 21 into the usual brake-actuating cylinders. When the brake-pedal is released, thereby effecting a release of the pressure in the inlet port 14, the ball-valve 24 resets itself against the neoprene seat 22. With the ball-valve 24 closed and the by-pass valve closed, the air is locked in the brake-actuating cylinders and the brakes are thereby maintained set. It will be observed in Fig. 1 that when the fluid is under pressure in the inlet port 14, the fluid will flow reversely through the by-pass ducts 37 and 35 and into the radial hole 66 and bore 65 of the valve-stem 40, thence through the bore 67 of the plunger 60 into the space behind the core-element 59, thus assisting the solenoid in maintaining the valve-washer 39 in contact with its seat 33.

When it is desired to release the brakes, the operator need only open the switch S, thereby to deenergize the solenoid and permit the valve-washer 39, under the action of the coil-spring 57, to snap to open position, shown in Fig. 2. With the by-pass thus opened the fluid can flow back from the brake-actuating cylinders through the port 32, valve-cavity 34 and ducts 35 and 37 into the inlet pressure pipe 13. The bore 67 in the plunger 60 and the bore 65 and hole 66 in the valve-stem 40 prevents the formation of an air-pocket between the end of the core-element 59 and the closure-cap 44. Thus the core-element 59 is free to quickly move into retracted position under the influence of the two coil-springs 57 and 61 when the solenoid is de-energized.

From the foregoing it will be perceived that this invention has provided a new and improved brake-locking mechanism which is wholly under the control of the operator; which will entirely relieve the operator of all strain and effort in holding the vehicle against coasting; which will relieve the vehicle of excessive starting shocks; and which can be rendered effective by merely closing a switch anytime before or during the depressing of the brake-pedal.

Having thus set forth the nature of the invention, what I claim herein is:

1. A control unit for a fluid brake system having a pressure-producing means and fluid actuated brakes, comprising a housing having an inlet adapted to be connected with a pressure-producing means and an outlet adapted to be connected with brakes, a cavity connecting said inlet and outlet, a one-way-acting check-valve in said cavity, a by-pass from said outlet to said inlet to permit return flow of fluid through said housing, a sleeve element, a control-valve embodied in said by-pass, comprising a valve-seat, a valve-member movable against said valve-seat to prevent the return flow of fluid through the by-pass and movable away from said valve-seat to open said by-pass, resilient means for moving said valve-member away from said valve-seat, and second means for moving said valve-member against said valve-seat, said second means including a core movable in said sleeve, a magnetic coil surrounding said sleeve and adapted when energized to cause said core to move in valve-closing direction, and resilient means carried by said core for engaging said valve-member whereby said valve-member is yieldingly held in contact with said valve-seat.

2. A control unit for a fluid brake system having a pressure-producing means and fluid actuated brakes, comprising a housing having an inlet adapted to be connected with a pressure-producing means and an outlet adapted to be connected with brakes, a cavity connecting said inlet and outlet, a one-way-acting check-valve in said cavity, a by-pass from said outlet to said inlet to permit return flow of fluid through said housing, a sleeve element, a control-valve embodied in said by-pass, comprising a valve-seat, a valve-member movable against said valve-seat to prevent the return flow of fluid through the by-pass and movable away from said valve-seat to open said by-pass, resilient means for moving said valve-member away from said valve-seat, and second means for moving said valve-member against said valve-seat, said second means including a core movable in said sleeve, a magnetic coil surrounding said sleeve and adapted when energized to cause said core to move in valve-closing direction, a plunger slidably journaled in said core and disposed to engage said valve-member, an abutment on said plunger, and a spring bearing at one end on said core and at its other end on said abutment.

3. A control unit of the class described comprising, a housing having an inlet and at least one outlet, a one-way-acting valve disposed between said inlet and outlet permitting flow of fluid from said inlet to said outlet, a by-pass from said outlet to said inlet to permit return flow of fluid through said housing, a sleeve element, a bushing fixed in said sleeve, a control-valve embodied in said by-pass comprising, a valve seat, a valve-member having a valve-stem slidably mounted in said bushing, an abutment formed on said valve-member, a spring bearing at one end on said valve-member abutment and at its other end on said bushing for normally urging said valve-member away from said valve-seat, and means adapted for overcoming the force of said spring and moving said valve-member into contact with said valve-seat to prevent the return flow of fluid through the by-pass, said means including a core movable in said sleeve, a member slidable in said core and disposed in alinement with said valve-stem, an abutment formed on said member, a spring bearing at one end on said last-named abutment and at its other end against said core, and a magnetic coil surrounding said sleeve and adapted when energized to cause said core to move in a direction to shift the valve-member into contact with said valve-seat.

4. A control unit of the class described comprising, a housing having an inlet and at least one outlet, a one-way-acting valve disposed between said inlet and outlet permitting flow of fluid from said inlet to said outlet, a by-pass from said outlet to said inlet to permit return flow of fluid through said housing, a sleeve element, a control-valve embodied in said by-pass comprising, a valve seat, a valve-member having a valve-stem slidably supported in said sleeve, a core movable in said sleeve, a member slidable in said core and disposed in alinement with said valve-stem, a magnetic coil surrounding said sleeve and adapted when energized to cause said core to move in a direction to shift the valve-member into contact with said valve-seat, and a fluid passageway extending lengthwise of said valve-stem and said member and provided for eliminating a fluid lock preventing movement of said core.

MARION M. McCOY.

REFERENCES CITED

The following references are of record in the file of this patent:

UNITED STATES PATENTS

| Number | Name | Date |
| --- | --- | --- |
| Re. 21,602 | Darling | Oct. 22, 1940 |
| 1,175,864 | Gold | Mar. 14, 1916 |
| 2,187,789 | Lanz | Jan. 23, 1940 |
| 2,217,141 | Sprenkle | Oct. 8, 1940 |
| 2,277,584 | Freeman | Mar. 24, 1942 |
| 2,279,243 | Parsons | Apr. 7, 1942 |
| 2,287,562 | Pennington | June 23, 1942 |
| 2,296,132 | Wiseley | Sept. 15, 1942 |
| 2,297,076 | Sacks | Sept. 29, 1942 |
| 2,313,232 | Freeman | Mar. 9, 1943 |
| 2,391,017 | Grontkowski | Dec. 18, 1945 |